United States Patent
Fehrenbach et al.

(10) Patent No.: US 7,605,748 B2
(45) Date of Patent: Oct. 20, 2009

(54) FILLING LEVEL RADAR FREQUENCY CONVERTER

(75) Inventors: Josef Fehrenbach, Haslach (DE); Daniel Schultheiss, Hornberg (DE); Karl Griessbaum, Muehlenbach (DE)

(73) Assignee: Vega Grieshaber KG, Wolfach (DE)

( * ) Notice: Subject to any disclaimer, the term of this patent is extended or adjusted under 35 U.S.C. 154(b) by 84 days.

(21) Appl. No.: 11/634,779

(22) Filed: Dec. 5, 2006

(65) Prior Publication Data

US 2008/0024354 A1  Jan. 31, 2008

Related U.S. Application Data

(60) Provisional application No. 60/742,410, filed on Dec. 5, 2005, provisional application No. 60/774,403, filed on Feb. 17, 2006.

(30) Foreign Application Priority Data

Dec. 5, 2005  (DE) .................. 10 2005 058 015

(51) Int. Cl.
  *G01S 13/32*  (2006.01)
(52) U.S. Cl. .................. 342/124; 342/123; 73/290 R
(58) Field of Classification Search .................. 367/908; 73/290 R; 342/123, 124
  See application file for complete search history.

(56) References Cited

U.S. PATENT DOCUMENTS

| 4,761,821 | A | * | 8/1988 | Mawhinney et al. .......... 455/73 |
| 5,406,842 | A | * | 4/1995 | Locke .................. 73/290 R |
| 5,546,088 | A |   | 8/1996 | Trummer et al. |
| 5,659,321 | A | * | 8/1997 | Burger et al. .............. 342/124 |
| 6,486,826 | B1 |  | 11/2002 | Cramer et al. |
| 6,591,086 | B1 | * | 7/2003 | Pleasant .................. 455/78 |
| 6,759,976 | B1 | * | 7/2004 | Edvardsson .............. 342/124 |
| 2004/0212529 | A1 |  | 10/2004 | Fehrenbach et al. |

FOREIGN PATENT DOCUMENTS

| DE | 43 31 353 | 3/1995 |
| DE | 43 34 079 | 4/1995 |
| DE | 198 13 604 | 9/1999 |
| DE | 102 10 708 | 10/2003 |
| EP | 0 469 169 | 2/1992 |
| EP | 1 562 051 | 8/2005 |
| WO | 92/18876 | 10/1992 |

* cited by examiner

*Primary Examiner*—Ian J Lobo
(74) *Attorney, Agent, or Firm*—Fay Kaplun & Marcin, LLP (57) ABSTRACT

A frequency converter for a filling level radar includes a signal generator unit, a receiver circuit, a transmit coupler, and an amplifier. The amplifier is amplifying the transmit signal at the high frequency side of the frequency converter. For frequency conversion, a mixer or a multiplier may be provided.

11 Claims, 6 Drawing Sheets

FILLING LEVEL RADAR FREQUENCY CONVERTER

REFERENCE TO RELATED APPLICATIONS

This application claims the benefit of the filing date of U.S. Provisional Application Ser. No. 60/742,410 filed Dec. 5, 2005, U.S. Provisional Application Ser. No. 60/774,403 filed Feb. 17, 2006 and German Patent Application Serial No. 10 2005 058 015.7 filed Dec. 5, 2005

FIELD OF THE INVENTION

The present invention relates to filling level measuring. In particular, the present invention relates to a frequency converter for a filling level radar, a filling level radar for determining a filling level in a tank, the use of such a frequency converter for filling level measuring, as well as a method for frequency conversion for a filling level radar.

TECHNOLOGICAL BACKGROUND

In addition to an antenna for transmitting or receiving radar or microwaves, known filling level measuring instruments have a frequency converter, which transforms an electromagnetic signal, which was generated by a transmit pulse oscillator, into high frequencies.

The document DE 43 31 353 relates to a radar distance measuring instrument with a frequency conversion circuit having a local oscillator, a mixer and an antenna port. The frequency conversion circuit converts a frequency of the signals received by a radar module by mixing with another frequency of the local oscillator into a higher frequency, with which the transmit signals are delivered to an antenna port.

Herein, the transmitting power depends on the power of the mixer. After leaving the mixer, there is no way to amplify the transmit signal again.

SUMMARY OF THE INVENTION

According to a sample embodiment of the present invention, a frequency converter for a filling level radar is provided the frequency converter comprising a signal generator unit for generating a frequency converted electromagnetic transmit signal, a receiver circuit for receiving a receive signal for determining a filling level, a transmit coupler, and a first amplifier for amplifying the frequency converted transmit signal and/or a receive signal, wherein the transmit coupler has an input for picking up the amplified frequency converted transmit signal from the signal generator unit, a first output for directly delivering the transmit signal to an antenna device, and for picking up a receive signal from the antenna device, and a second output for delivering the receive signal to the receiver circuit.

Thus, the frequency converter according to the invention has an amplifier, which may amplify a frequency converted high frequency transmit signal before it is radiated by the antenna, or which may amplify the receive signal received by the antenna before it is back transformed into a low frequency.

Due to this additional amplification, an improved signal/noise ratio as well as a higher sensitivity may be achieved. In particular, this may also allow for measuring less favorable filling materials, for which otherwise the reflected signal would be too weak to achieve acceptable, useful measuring results.

According to another sample embodiment of the present invention, the transmit coupler is adapted as a directional coupler, which comprises a symmetrical or asymmetrical hybrid coupler.

Such an asymmetrical hybrid coupler may be realized e.g. as a 90° hybrid coupler, which is in particular appropriate in conjunction with a circular wave guide coupling.

According to another sample embodiment of the present invention, the antenna device has a circular wave guide coupling, wherein the first output of the transmit coupler is coupled with the circular wave guide coupling for injecting the transmit signal.

The combination of a symmetrical 90° hybrid coupler and a circular coupling now may produce a separation of transmitting and receiving path. Thereby, expensive components, such as a circulator, may be omitted, and at the same time, the full generator power may be forwarded to the antenna.

According to another sample embodiment of the present invention, the signal generator unit for generating an electromagnetic transmit signal may be adapted for a frequency of between 60 gigahertz and 120 gigahertz.

E.g. the frequency converter may be realized as a 79 gigahertz HF module. However, higher frequencies may also be possible, e.g. frequencies of about 120 gigahertz.

According to another sample embodiment of the present invention, the frequency converter comprises a second amplifier for amplifying the receive signal, wherein the second amplifier is arranged after the second output.

Thus, according to this sample embodiment of the present invention, two amplifiers may be provided, with the first amplifier being e.g. for amplifying the input signal in the transmit coupler, and the second amplifier being for amplifying the output signal or the received signal after leaving the transmit coupler. Both amplifiers may be located at the high frequency side of the frequency converter. Thus, flexible amplification of the input or output signals may be ensured.

According to another sample embodiment of the present invention, the signal generator unit comprises a pulse generator for generating a first electromagnetic signal with a first frequency, a local oscillator for generating a second electromagnetic signal with a second frequency, and a first mixer for frequency converting the first electromagnetic signal from the pulse generator by means of the second electromagnetic signal from the local oscillator, wherein the first mixer is realized for outputting the transmit signal.

Thus, a mixer may be provided, which receives an input signal from the pulse generator, and then mixes this input signal by means of a signal from the local oscillator (which may be situated e.g. between 10 and 25 gigahertz) into higher frequencies. The result of this mixing may then the transmit signal, which may subsequently be amplified and fed into the transmit coupler.

According to another sample embodiment of the present invention, the frequency converter further comprises a second mixer for frequency converting the receive signal by means of a third electromagnetic signal from the local oscillator. Thus, both signals are mixed by the same local oscillator.

E.g. it may also be possible to provide an additional local oscillator, which is for instance phase locked coupled with the other local oscillator so that both oscillators run synchronously.

E.g. the second mixer may mix the frequency of the receive signal into low frequencies so that the frequency converted receive signal is then easy to evaluate.

According to another sample embodiment of the present invention, the signal generator unit of the frequency converter further comprises a pulse generator for generating the first electromagnetic signal with the first frequency, and a first multiplier for multiplying the first electromagnetic signal from the pulse generator, and for outputting the multiplied signal as a transmit signal.

Signal multiplication may be performed by establishing harmonics at a non linear characteristic curve, e.g. at a semiconductor device. A mixer may not be required. According to this sample embodiment, not two input signals with different frequencies may be added (by the mixer). Rather, there may only be one input signal, which is multiplied (e.g. by the factor 4 or the factor 8 or by another factor).

Thereby, a simple circuit may be provided, which may provide a good signal/noise ratio, and a higher sensitivity.

According to another sample embodiment of the present invention, the frequency converter comprises a third mixer for frequency converting a low frequency signal from a pulse generator by means of the third electromagnetic signal from the local oscillator, whereby a frequency converted signal is created.

According to another sample embodiment of the present invention, the frequency converter further comprises a third amplifier for amplifying the frequency converted signal, in order to compensate for losses having occurred in the third mixer.

According to another sample embodiment of the present invention, a filling level radar for determining the filling level in a tank may be provided, which has an antenna for transmitting and/or receiving electromagnetic waves, as well as a frequency converter described above.

Moreover, the use of a frequency converter for level measuring according to the invention may be provided.

Moreover, a method for frequency conversion for a filling level radar may be provided, the method comprising the steps of generating a frequency converted electromagnetic transmit signal, amplifying the transmit signal, picking up the amplified transmit signal in an input of a transmit coupler, directly delivering the transmit signal from a first output of the transmit couplers to an antenna device, picking up a receive signal in the first output of the transmit coupler, delivering the receive signal from a second output of the transmit coupler to a receiver circuit, and receiving the receive signal for determining a filling level.

Thereby, a method may be provided, by which the sensitivity of the measurement may be increased, e.g. by amplifying the transmit signal at the high frequency side of the frequency converter.

After frequency conversion, the transmit signal may thus be amplified again additionally.

According to another sample embodiment of the present invention, the step of generating the frequency converted electromagnetic signal may comprise a first frequency conversion with a first mixer.

Moreover, the evaluation of the receive signal for determining a filling level may comprise a second frequency conversion with a second mixer.

Alternatively, signal multiplication may be provided, which is implemented for generating the electromagnetic transmit signal so that harmonics are created based on a non linear characteristic curve of a component.

An input side mixer for generating a high frequency signal may thus not be required.

BRIEF DESCRIPTION OF THE DRAWINGS

Hereafter, with reference to the figures, sample embodiments of this invention will be described.

The diagrams in den figures are schematic and not to scale.

DETAILED DESCRIPTION OF THE DRAWINGS

In the following description of the figures, the same reference symbols are used for identical or similar elements.

Figure 1:
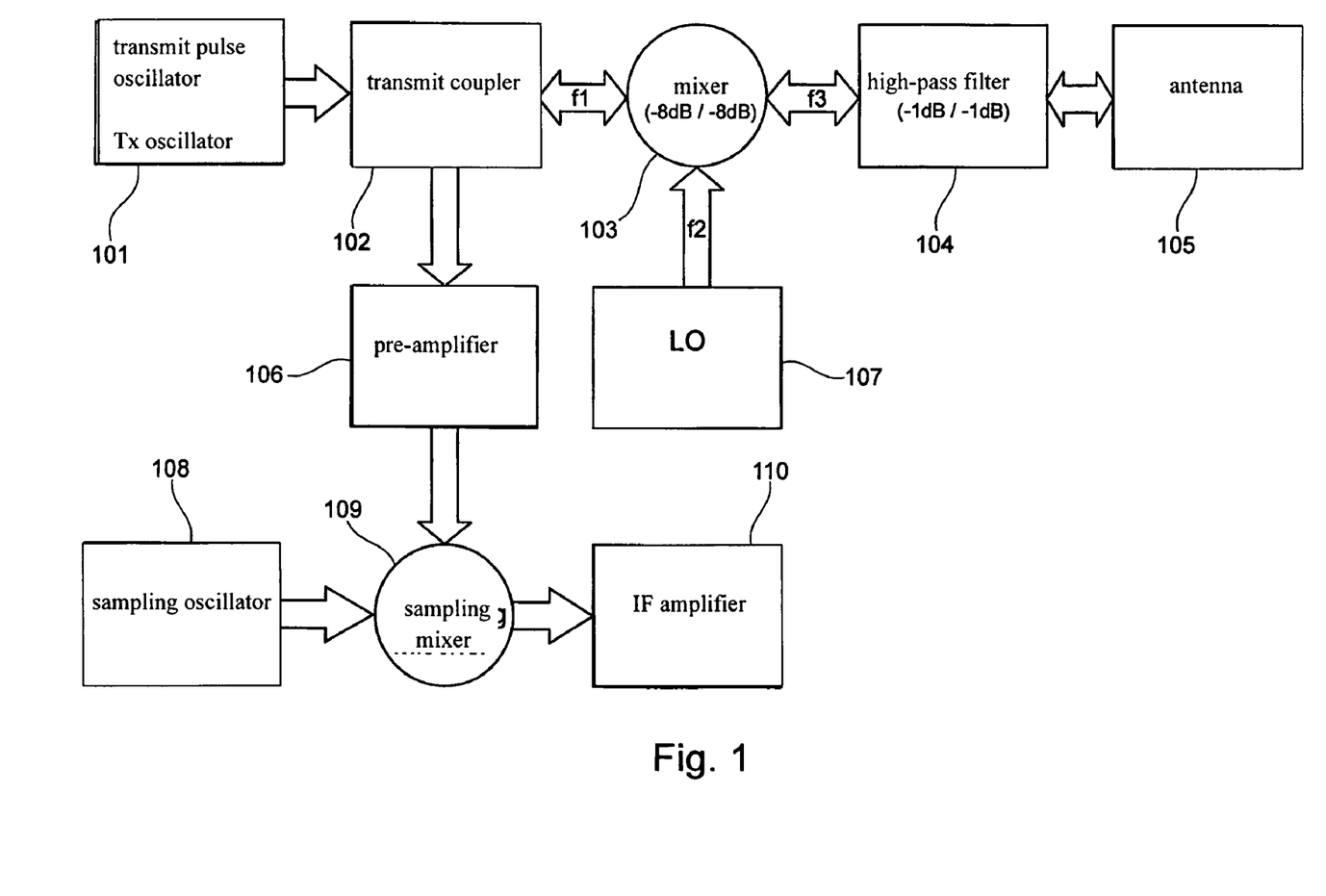
FIG. 1 shows a schematic diagram of a frequency converter.

FIG. 1 shows a schematic diagram of a frequency converter. The frequency converter has a transmit pulse oscillator 101 (Tx oscillator). The electromagnetic signal at the frequency f1 generated therein is passed on to a transmit coupler 102, which subsequently forwards it to a mixer 103.

A local oscillator 107 generates another signal at the frequency f2, which may also be supplied to the mixer 103. From the signal of the transmit pulse oscillator 101 and the signal of the local oscillator 107, the mixer 103 may then generate a frequency elevated signal at the frequency $f3=f1+f2$, which is then passed on to a high-pass filter 104. The high-pass filter 104 then delivers the high frequency transmit signal to the antenna 105. The antenna 105 then radiates the signal towards the filling material.

The signal reflected by the filling material is picked up by the antenna 105 and guided to the high-pass filter 104. The latter then forwards the receive signal to the mixer 103, which mixes the receive signal at the frequency f3 together with the local oscillator at the frequency f2 back into the original lower frequency range of the transmit pulse oscillator to the frequency $f1=f3-f2$, and then hands it over to the transmit coupler 102.

In the mixer 103, a back transformation of the receive signal to lower frequencies may have taken place.

Next, the transmit coupler 102 may deliver the receive signal to the pre-amplifier 106. The pre-amplifier 106 then supplies the receive signal to a sampling mixer 109, which additionally receives a signal from a sampling oscillator 108. The output signal of the sampling mixer 109 may then reach an intermediate frequency amplifier 110, and may subsequently be evaluated, e.g. for determining the filling level.

In this system, the transmitting power may amount to about −5 to 0 dBm, depending on the mixer used. The maximum attenuation that may be inserted thus may amount to about 75 to 80 dB.

Figure 2:
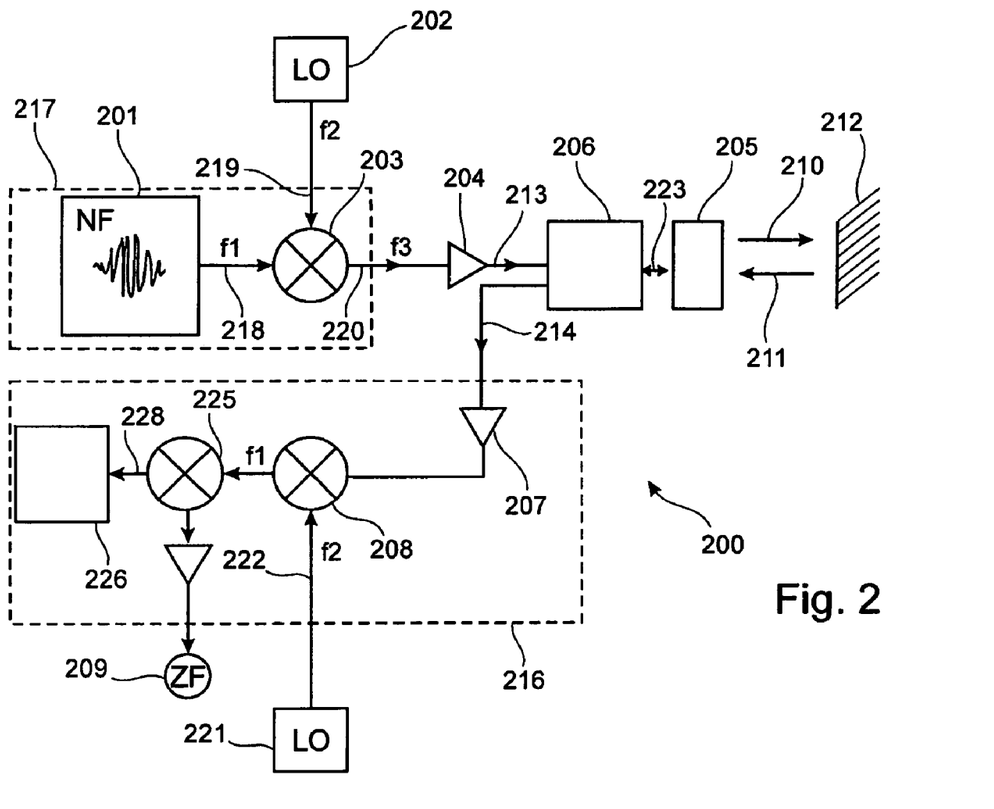
FIG. 2 shows a schematic diagram of a frequency converter according to a sample embodiment of the present invention.

FIG. 2 shows a schematic diagram of a frequency converter according to a sample embodiment of the present invention. As may be seen in FIG. 2, the frequency converter 200 has a signal generator unit 217, a receiver circuit 216, an amplifier 204, an amplifier 207, a local oscillator 202, and a transmit coupler 206.

Herein, the signal generator unit 217 comprises a pulse generator 201 for generating electromagnetic waves or electromagnetic pulses. The generated signal 218 at the frequency f1 is then forwarded to a mixer 203, which may also accept a signal 219 at the frequency f2 from a local oscillator 202.

From both input signals 218, 219, the mixer generates a high frequency output or transmit signal 220 at the frequency f3=f1+f2.

This transmit signal 220 is then amplified by the amplifier 204, and passed on as an amplified signal 213 to the transmit coupler 206.

The transmit coupler 206 is realized e.g. as a symmetrical or asymmetrical hybrid coupler or circulator. The signal 213 runs through the transmit coupler 206 with relatively low attenuation, and is passed on as a signal 223 to an antenna array 205. The antenna array 205 is realized for transmitting/receiving high frequency signals, and comprises e.g. a wave guide for transmitting the signals from the transmit coupler 206 to the antenna and back again.

The antenna array 205 emits a measuring pulse 210, which is then reflected by the object or medium to be measured (which is for instance a filling material surface 212) as a receive signal 211. The receive signal 211 is subsequently picked up again by the antenna array 205, and transmitted to the transmit coupler 206.

The transmit coupler 206 now outputs the received signal at the output 214. The amplifier 207 amplifies the receive signal 214, and forwards it to the receiver circuit 216.

It has to be noted that not necessarily two amplifiers 204, 207 are provided. Rather, a single amplifier, e.g. the amplifier 204, or else only the amplifier 207, may be provided, depending on whether the input signal 220 or the output signal 214 is to be amplified. At any rate, the amplifier(s) may be arranged at the high frequency side of the frequency converter 200.

The receiver circuit 216 comprises a mixer 208, a sampling-mixer 225, a pulse generator 226 and an intermediate frequency amplifier 227.

Between the second mixer 208 and the sampling-mixer 225, another amplifier may be connected (not shown in FIG. 2).

It is to be noted that the local oscillators 202, 221 may be different oscillators. However, they may also be realized as a single oscillator, feeding the mixers 203, 208.

The oscillator 202 may be arranged either in the receiver circuit 216, or in the signal generator unit 217, or else separately.

In the receiver circuit 216, the amplified receive signal at the frequency f3 is then fed into the second mixer 208, which is also fed by the local oscillator 202 with the signal 222 at a frequency f2. Herein, inverse mixing to a lower frequency is now performed. The resulting signal 224 at the frequency of f1=f3−f2 is then delivered to the sampling-mixer 225, where it is sampled by the signal. The sampled, retarded signal 229 is then again amplified by the amplifier 227, and is available at the intermediate frequency output 209 as an intermediate frequency signal for evaluation and determination of the filling level.

With the system of such a construction, a substantially higher sensitivity is achieved. The maximum attenuation that may be inserted into the measuring path may be up to about 95 dB depending on the amplifier used.

Figure 3:
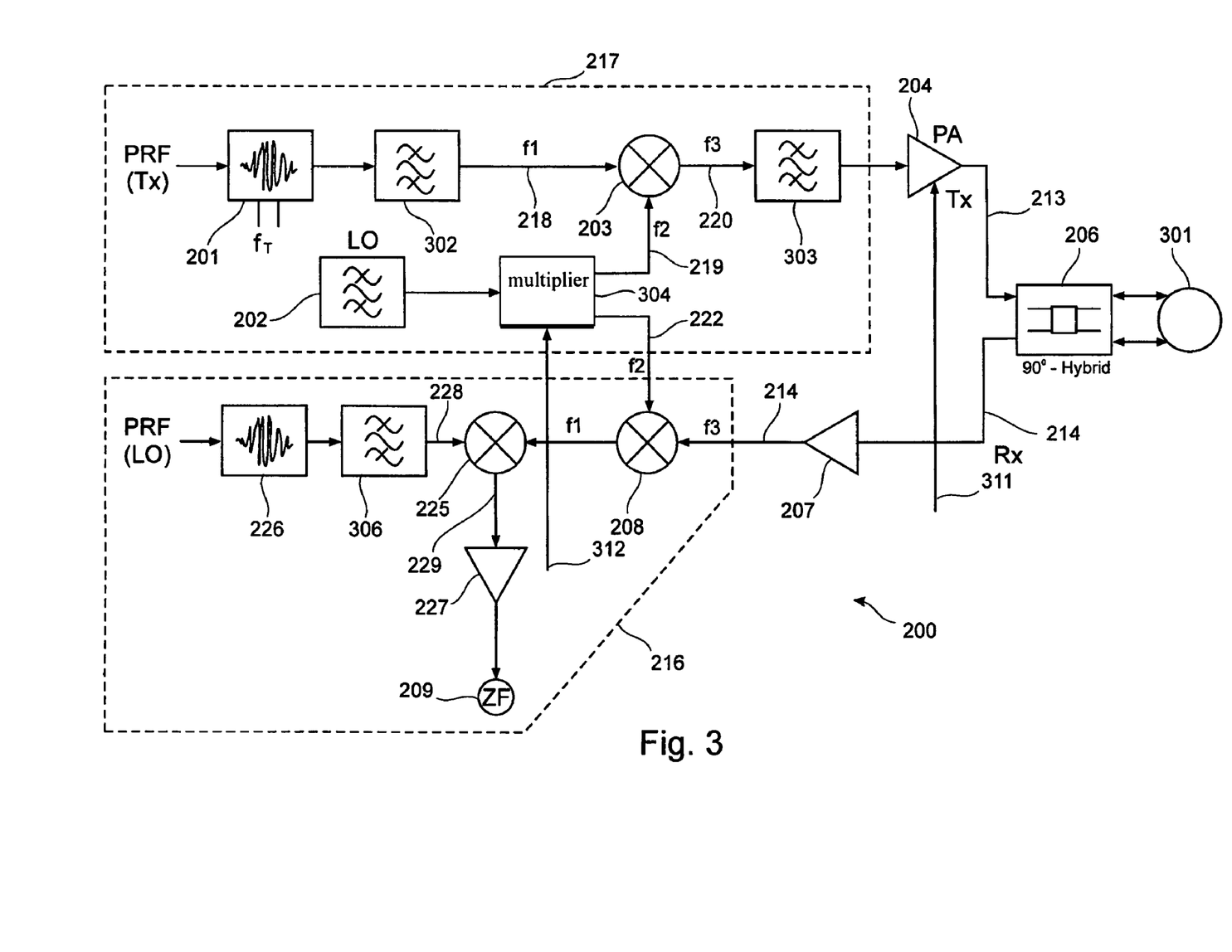
FIG. 3 shows a schematic diagram of a frequency converter according to another sample embodiment of the present invention.

FIG. 3 shows a schematic diagram of a frequency converter according to another sample embodiment of the present invention. The frequency converter 200 represented in FIG. 3 further has a band-pass filter 302, and is arranged between the first mixer 203 and the pulse generator 201. Moreover, the module of FIG. 3, which is configured as a 79 gigahertz HF module, has a second band-pass filter 303. This second band-pass filter 303 is arranged between the first mixer 203 and the first amplifier 204.

The first amplifier 204 has a DC supply 311, which may be either permanently supplied with a voltage, or is supplied with the pulsed input signal of the pulse generator 201. Pulsed operation results in substantially lower power consumption than continuous operation.

Moreover, a circular wave guide coupling 301 is provided in order to inject signals from the transmit coupler 206 or to deliver them to the transmit coupler 206 (from the antenna). The transmit coupler 206 is herein realized as a 90° hybrid coupler.

Both mixers 203, 208 are fed by the local oscillator 202 (generating frequencies e.g. of 10 and 25 gigahertz) and a multiplier 304. The multiplier 304 has a DC supply 312, which may also be applied permanently to the supply voltage, or is supplied with the pulsed input signals of both pulse generators 201 and 226.

The second mixer 208 may deliver the inverse mixed low frequency signal to the sampling mixer 225. Moreover, the sampling mixer 225 is supplied with signals 228 from a pulse generator 226. Between the sampling mixer 225 and pulse generator 226, a band-pass filter 306 may be connected.

The output signals of the sampling mixer 225 are amplified via the amplifier 227, and are available at the intermediate frequency output 209 for further processing and evaluation.

Figure 4:
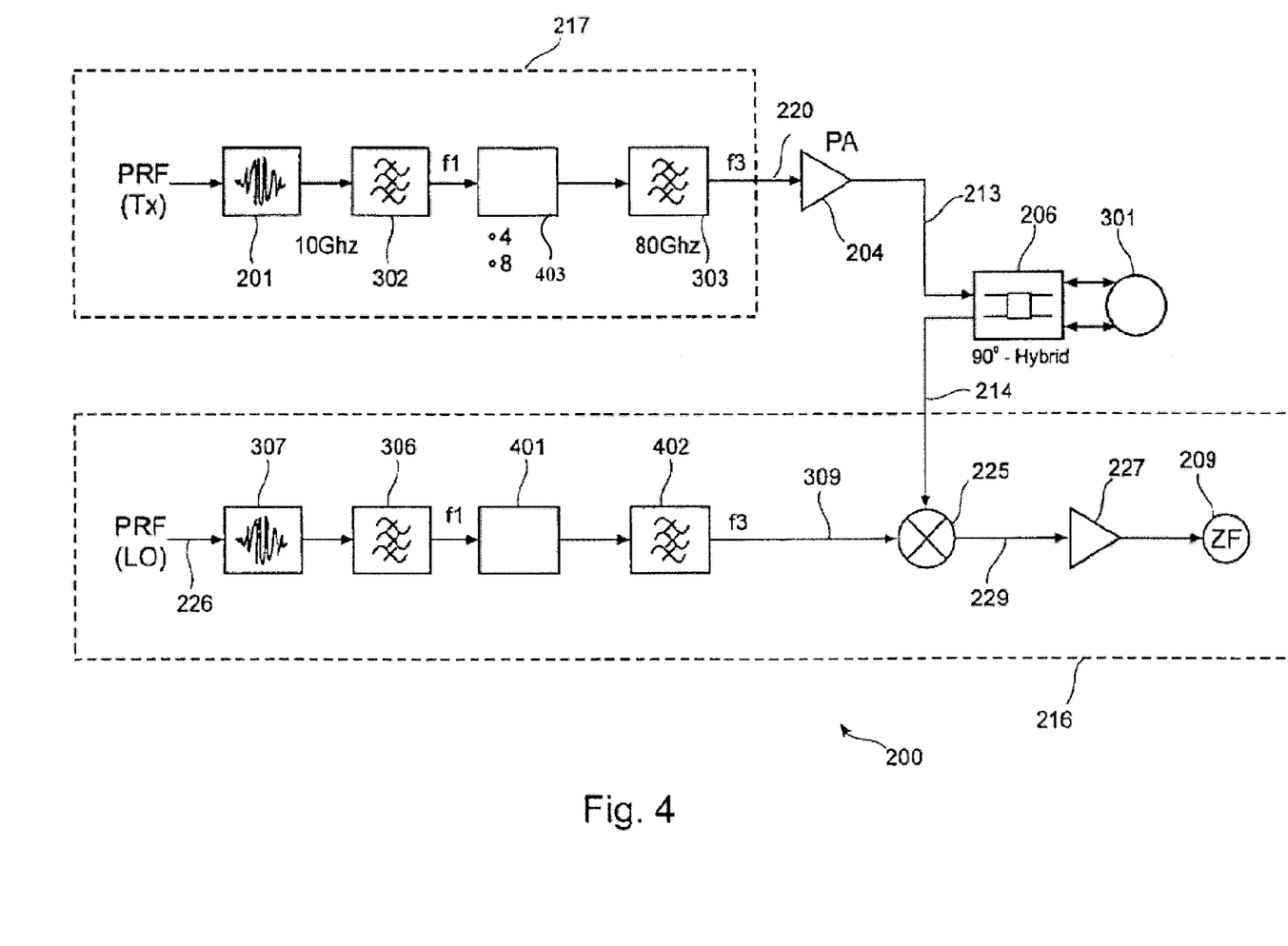
FIG. 4 shows a schematic diagram of a frequency converter according to another sample embodiment of the present invention.

FIG. 4 shows a schematic diagram of a frequency converter according to another sample embodiment of the present invention. Herein, the frequency converter of FIG. 4 has, in addition to the pulse generator 201, a band-pass filter 302, a multiplier 403, and another band-pass filter 303. The multiplier 403 may ensure signal multiplication through the creation of harmonics at the non linear characteristic curve of a semiconductor device (e.g. a transistor or diode).

The signal generated by the pulse generator 201 has a frequency of for instance f1=10 gigahertz. The signal 220, which is multiplied by the factor 8 and filtered, for instance has a frequency of f3=8*10 GHz=80 gigahertz. However, other frequencies may of course also be generated.

The receive signal 214 is supplied to the sampling mixer 225, which in this example has to be designed for the high frequency f3. The sampling mixer 225 continues to receive a signal 309, which is generated by the pulse generator 226 and supplied to a second multiplier 401, after filtering through a band-pass filter 306. After corresponding multiplication, the signal runs through another band-pass filter 402, before being then fed into the sampling mixer 225.

Thereby, a simple circuit may be provided, which may allow amplification of the transmit signal 220 after frequency multiplication to higher frequencies.

Figure 5:
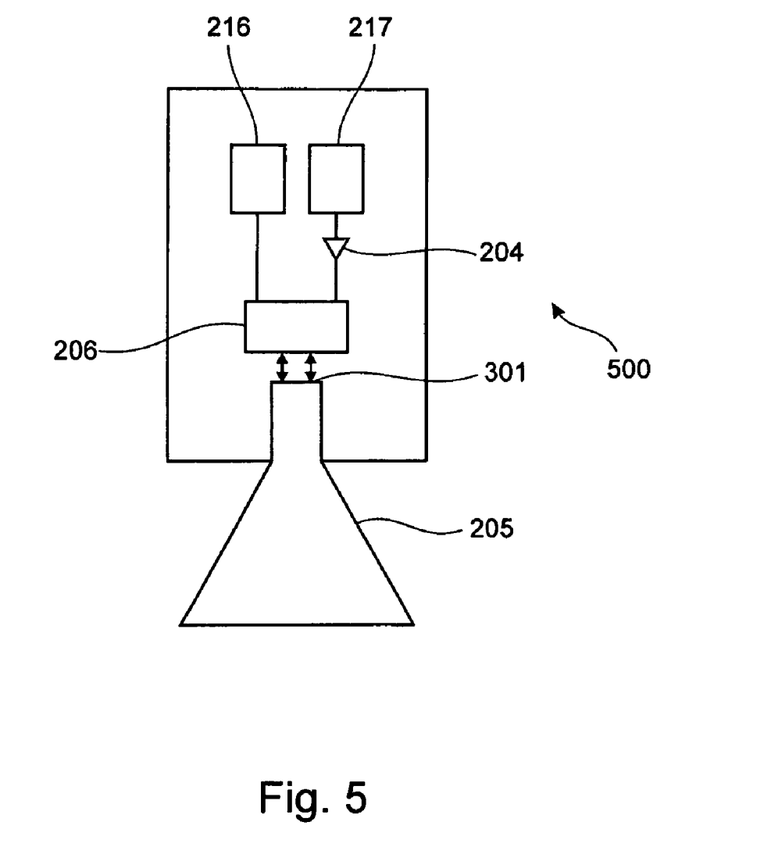
FIG. 5 shows a schematic diagram of a filling level radar according to a sample embodiment of the present invention.

FIG. 5 shows a schematic diagram of a filling level radar according to another sample embodiment of the present invention.

Herein, the filling level radar 500 has a signal generator unit 217, an amplifier 204, a transmit coupler 206, and a receiver circuit 216. Moreover, an antenna device 205 with a circular wave guide coupling 301 may be provided.

Figure 6:
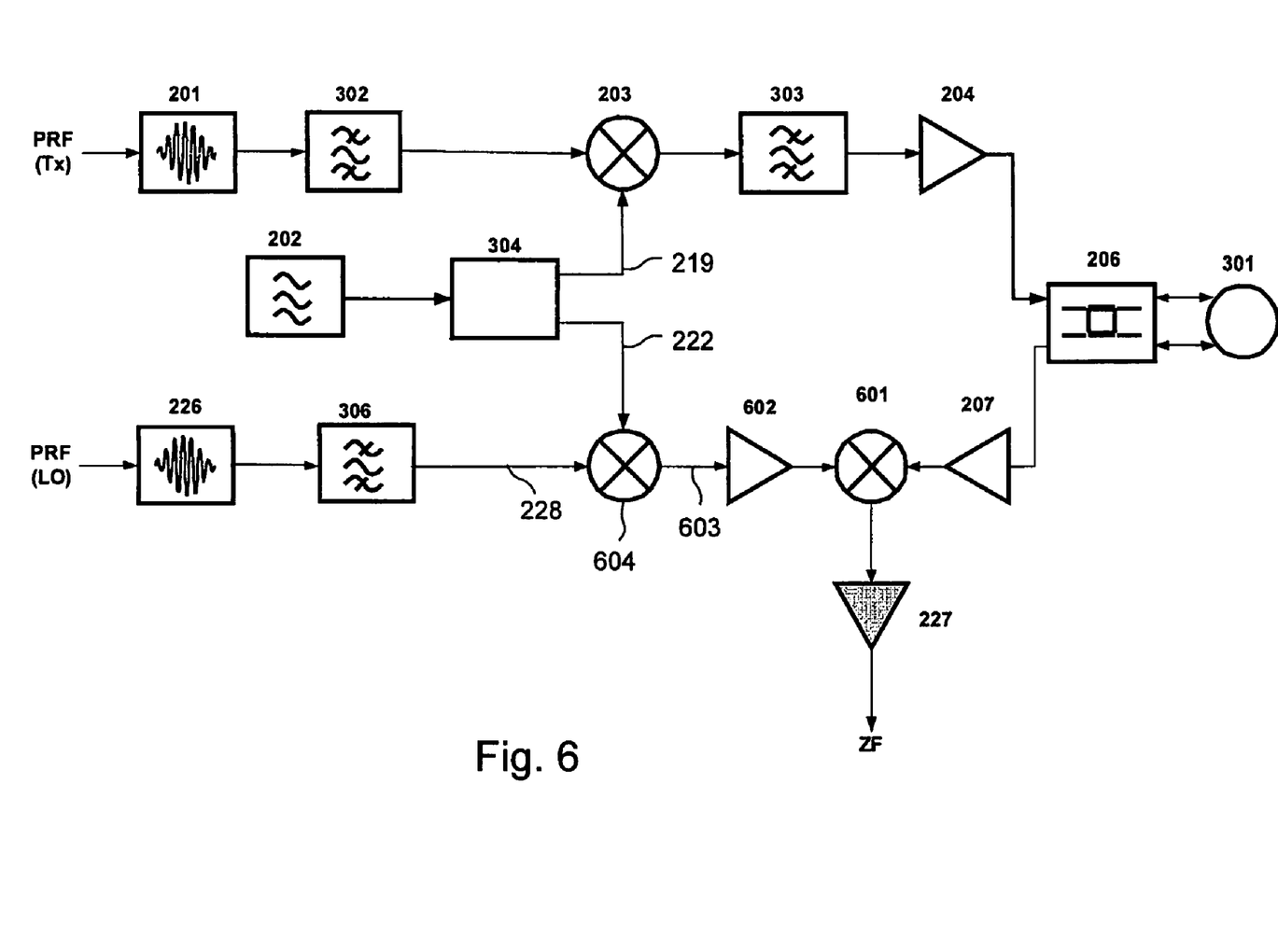
FIG. 6 shows a schematic diagram of a frequency converter according to another sample embodiment of the present invention.

FIG. 6 shows a schematic diagram of a frequency converter according to another sample embodiment of the present invention. The frequency converter represented in FIG. 6 functions like the system described with reference to FIG. 3. However, sampling mixer 225, which in FIG. 3 operates at the lower frequency, is omitted.

The lower frequency microwave pulse (e.g. 10 GHz) is instead elevated at the mixer 604 (corresponding to mixer 208 of FIG. 3) to the higher frequency of e.g. 80 GHz. This signal may now also be stepped up by the amplifier 602 in order to compensate the losses having occurred inside the mixer 208. Thereafter, this signal, together with the signal received and amplified in amplifier 207, is stepped down in the sampling mixer 601 to the intermediate frequency.

An advantage of this system may be that only one mixing has to take place in the receive branch (at 601). The losses in the second mixer (208 of FIG. 3 or 604 of FIG. 6) may be compensated by the amplifier 602. Depending on quality, the mixing losses created in FIG. 3 at the mixer 208 may amount to about 10 . . . 15 dB. In fact, the sensitivity of the above described system may also be improved by this value with respect to the system in FIG. 3.

By tuning to the high frequency, the performance of the sampling mixer 601 may change only negligibly with respect to the sampling mixer 225 of FIG. 3, operating at the lower frequency.

Additionally, it is to be noted that "comprising" does not exclude any other items or steps, and that "a" or "an" do not exclude a plurality. Furthermore, it is to be noted that features or steps having been described with reference to one of the above sample embodiments may also be used in combination with other features or steps of other embodiments described above. Reference numerals in the claims are not to be construed as limitations.

The invention claimed is:

1. A frequency converter for a filling level radar, the frequency converter comprising:
   a signal generator unit for generating a frequency converted electromagnetic transmit signal;
   a receiver circuit for receiving a receive signal for determining a filling level;
   a sampling mixer for retarding the receive signal;
   a transmit coupler; and
   a first amplifier for amplifying one of the frequency converted transmit signal and the receive signal;
   wherein the transmit coupler has an input for picking up the amplified frequency converted transmit signal from the signal generator unit, a first output for directly delivering the transmit signal to an antenna device, and for picking up the receive signal from the antenna device, and a second output for delivering the receive signal to the receiver circuit; and
   wherein the signal generator unit comprises a first frequency converter unit for converting the frequency of the transmit signal and the receiver circuit comprises a second frequency converter unit for converting one of the one of the receive signal and of a signal generated by a pulse generator.

2. The frequency converter according to claim 1,
   wherein the transmit coupler is realized as a directional coupler, which comprises a symmetrical or asymmetrical hybrid coupler.

3. The frequency converter according to claim 1,
   wherein the antenna device has a circular wave guide coupling; and
   wherein the first output of the transmit coupler is coupled with the circular wave guide coupling for injecting the transmit signal.

4. The frequency converter according to claim 1,
   wherein the signal generator unit for generating an electromagnetic transmit signal is realized at a frequency of between 60 gigahertz and 120 gigahertz.

5. The frequency converter according to claim 1, further comprising:
   a second amplifier for amplifying one of the receive signal and the frequency converted transmit signal;
   wherein the second amplifier is arranged after the second output.

6. The frequency converter according to claim 1, the signal generator unit comprising:
   the pulse generator for generating a first electromagnetic signal at a first frequency;
   a local oscillator for generating a second electromagnetic signal at a second frequency; and
   a first mixer for frequency convening the first electromagnetic signal from the pulse generator by means of the second electromagnetic signal from the local oscillator;
   wherein the first mixer is realized for outputting the transmit signal.

7. The frequency converter according to claim 6, further comprising:
   a second mixer for frequency converting the receive signal by means of a third electromagnetic signal from the local oscillator.

8. The frequency converter according to claim 1, the signal generator unit comprising:
   the pulse generator for generating the first electromagnetic signal at the first frequency; and
   a first multiplier for multiplying the first electromagnetic signal from the pulse generator and for outputting the multiplied signal as a transmit signal.

9. The frequency converter according to claim 7,
   wherein the second frequency converter is adapted for frequency converting a low frequency signal from the pulse generator by means of the third electromagnetic signal from the local oscillator, whereby a frequency converted signal is created.

10. The frequency converter according to claim 9, further comprising:
    a second amplifier for amplifying the frequency converted signal, in order to compensate losses having occurred in the second frequency converter.

11. A filling level radar for determining a filling level in a tank, the filling level radar comprising:
    an antenna for transmitting and/or receiving electromagnetic waves;
    a frequency converter, comprising:
      a signal generator unit for generating a frequency converted electromagnetic transmit signal;
      a receiver circuit for receiving a receive signal for determining a filling level;
      a sampling mixer for retarding the receive signal;
      a transmit coupler; and
      a first amplifier for amplifying one of the frequency converted transmit signal and the receive signal;
      wherein the transmit coupler has an input for picking up the amplified frequency converted transmit signal from the signal generator unit, a first output for directly delivering the transmit signal to an antenna device, and for picking up the receive signal from the antenna device, and a second output for delivering the receive signal to the receiver circuit; and
      wherein the signal generator unit comprises a first frequency converter unit for converting the frequency of the transmit signal and the receiver circuit comprises a second frequency converter unit for converting one of the frequency of the receive signal and of a signal generated by a pulse generator.

* * * * *